United States Patent [19]

Grenzicki

[11] Patent Number: 4,694,923
[45] Date of Patent: Sep. 22, 1987

[54] HEAVY DUTY DISPLAY CART

[76] Inventor: Lawrence B. Grenzicki, 24780 Adlai, East Detroit, Mich. 48021

[21] Appl. No.: 920,244

[22] Filed: Oct. 17, 1986

[51] Int. Cl.$^4$ .............................................. B62D 1/28
[52] U.S. Cl. ...................................... 180/6.5; 180/21; 180/22; 180/209
[58] Field of Search ................... 180/6.5, 209, 21, 22, 180/15

[56] References Cited

U.S. PATENT DOCUMENTS

| 2,874,791 | 2/1959 | Mellencamp | 180/6.5 |
| 4,078,630 | 3/1978 | Krieg | 180/6.5 |
| 4,299,301 | 11/1981 | Janin | 180/6.5 |
| 4,475,611 | 10/1984 | Fisher | 180/6.5 |

Primary Examiner—John J. Love
Assistant Examiner—Dom McGiehan
Attorney, Agent, or Firm—Brooks & Kushman

[57] ABSTRACT

A heavy duty display cart (10) disclosed comprises a carriage (14) for supporting an object to be displayed, such as a vehicle (12). A reversible drive mechanism (16) is supported below the carriage (14) for rotation with respect thereto about a vertical axis (A). The drive mechanism (16) includes a pair of drive wheels (18) and a pair of reversible drive motors (20) respectively coupled to the pair of drive wheels to provide rotation of the drive mechanism about the vertical axis (A) or movement of the cart. A magnetic latch mechanism (22) on the carriage (14) and drive mechanism (16) fixes the rotational location of the drive mechanism with respect to the carriage in first, second, third, and fourth positions spaced at 45 degree intervals about the vertical axis (A) and provides ten directions of movement of the cart (10) upon reverse driving of the drive mechanism. A radio receiver (23) operates the drive mechanism (16) and the magnetic latch mechanism (22). A radio transmitter (24) operates the receiver to control operation of the cart (10) from a remote location.

13 Claims, 7 Drawing Figures

HEAVY DUTY DISPLAY CART

TECHNICAL FIELD

This invention relates to a heavy duty cart including a carriage and remote controlled drive mechanism.

BACKGROUND ART

Vehicles such as automobiles and trucks are frequently displayed in auto shows, in automobile showrooms, etc. These vehicles can be stationarily displayed or mounted onto a cart for movement about a display arena.

Prior art devices used as carts for moving a displayed vehicle have included a movable frame having a display surface fixed onto the frame. One such device is disclosed in U.S. Pat. No. 2,874,791 wherein wheels of the displayed vehicle are supported by the display surface and limited movement of the displayed vehicle is provided upon movement of the display cart. When changing the direction of movement of the displayed vehicle, the entire vehicle is rotated together with the fixed display surface and frame.

No conventional devices are known which provide a universally movable display cart and rotatable display surface that does not require rotation of the displayed vehicle in order to change the direction of movement of the vehicle displayed.

DISCLOSURE OF INVENTION

An object of the present invention is to provide a heavy duty display cart which can be operated by remote control and used to universally movably display a vehicle for viewing by the public.

In carrying out the above object, the heavy duty display cart includes a carriage for supporting an object to be displayed, such as the vehicle. A reversible drive mechanism is supported below the carriage for rotation with respect thereto about a vertical axis. The drive mechanism includes a pair of drive wheels and a pair of reversible drive motors respectively coupled to the pair of drive wheels to provide rotation of the drive mechanism about the vertical axis or movement of the cart.

A magnetic positioner on the carriage and drive mechanism fixes the rotational location of the drive mechanism with respect to the carriage in first, second, third and fourth positions spaced at 45 degree intervals about the vertical axis to provide ten directions of movement of the cart upon reverse driving of the drive mechanism. A radio receiver operates the drive mechanism and a magnetic latch mechanism, and a radio transmitter operates the receiver to control the operation of the cart from a remote location.

In the preferred construction of the cart, the carriage comprises a frame of a generally rectangular planar shape. The frame can be made adjustable to accommodate different wheel base sizes. Furthermore, casters mounted at the corners of the rectangular frame provide floor engagement that supports the cart for universal movement and heavy duty load bearing capability.

The heavy duty display cart also preferably includes a turret that mounts the drive mechanism on the carriage for rotation about the vertical axis. The pair of drive wheels and pair of reversible drive motors coupled thereto have drive axes of rotation in a horizontal plane and are in a spaced and parallel relationship to each other on opposite sides of the vertical axis. In this arrangement, the pair of drive wheels are located at diametrically opposite locations with respect to the vertical axis.

The carriage has arcuate connector strips positioned circumferentially about the vertical axis. The turret has a brush contact support attached extending radially from the vertical axis. Brush contacts mounted on the brush contact support slidably engage the arcuate connector strips and provide electrical connections that energize the reversible drive motors to drive the drive wheels and thereby rotate the turret with respect to the carriage about the vertical axis or move the cart.

The turret also has a magnetic support arm attached thereto that extends radially from the vertical axis. The magnetic latch mechanism includes four positioner surfaces fixed on the carriage radially spaced from the vertical axis. The magnetic latch mechanism also includes an electromagnet that is mounted on the support arm and cooperates with the magnetic positioner surfaces to fix the turret position with respect to the carriage.

The objects, features, and advantages of the present invention are readily apparent from the following detailed description of the best mode for carrying out the invention when taken with the accompanying drawings.

BEST MODE FOR CARRYING OUT THE INVENTION

Figure 1:
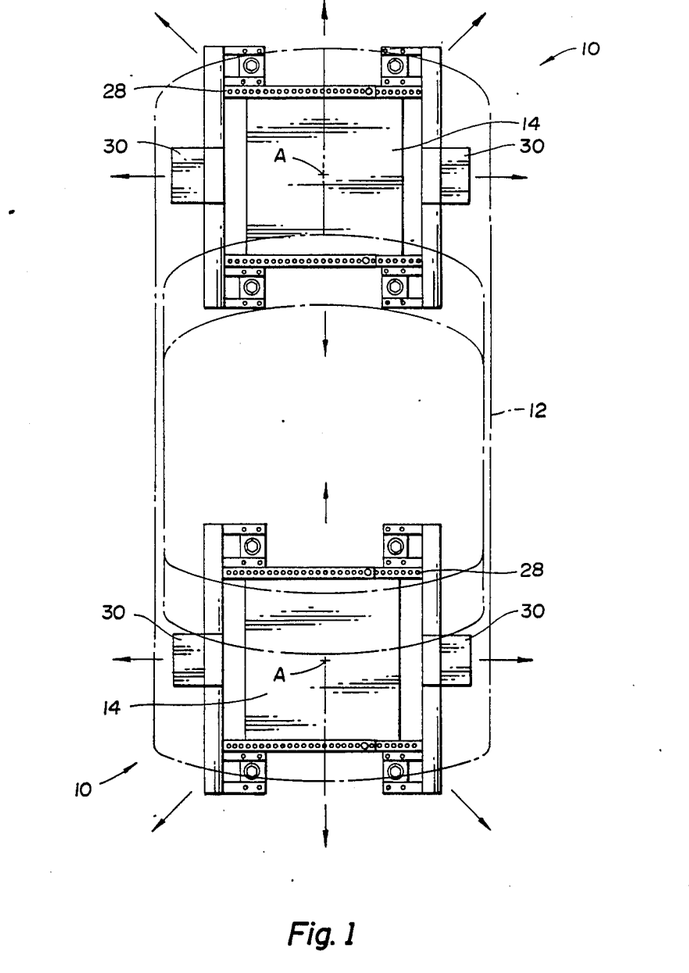
FIG. 1 is a plan view showing two heavy duty display carts constructed in accordance with the present invention supporting a vehicle shown in phantom.

With reference to FIG. 1 of the drawings, a heavy duty display cart constructed in accordance with the present invention is generally indicated by 10 and is used together with a second display cart to movable display a vehicle 12 without the aid of a vehicle driver. As is more fully hereinafter described, the heavy duty display cart 10 is universally movable, remote controlled, and adjustable for accommodating the wheel base of different size vehicles.

Figure 4:
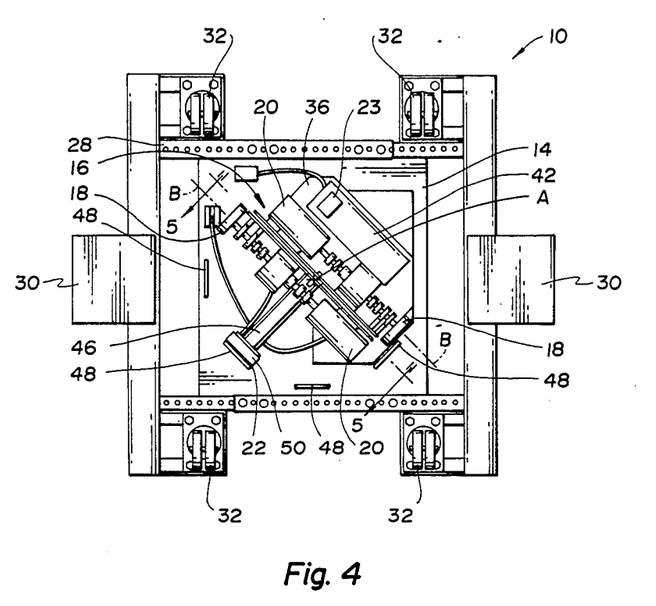
FIG. 4 is a view of the underside of the heavy duty display cart showing a drive mechanism and caster arrangement.

As shown in FIG. 4, the heavy duty display cart 10 comprises a carriage 14 for supporting an object to be displayed such as vehicle 12 shown in FIG. 1. A reversible drive mechanism 16 of the cart 10 includes a pair of drive wheels 18 and a pair of reversible drive motors 20 respectively coupled to the pair of drive wheels. The drive wheels 18 provide rotation of the drive mechanism 16 about a vertical axis A or movement of the cart 10.

A magnetic latch mechanism 22 on the carriage 14 and drive mechanism 16 fixes the rotational location of the drive mechanism with respect to the carriage in first, second, third, and fourth positions spaced at 45 degree intervals about vertical axis A of cart 10. These positions provide for ten directions of movement of one cart 10 upon reverse driving of the drive mechanism 16. Specifically, cart 10 can be controlled to move forward and reverse along a fixed line, to left and right across the fixed line, forward and reverse at 45 degrees in both directions from the line, and clockwise or counterclockwise about vertical axis A.

Figure 6:
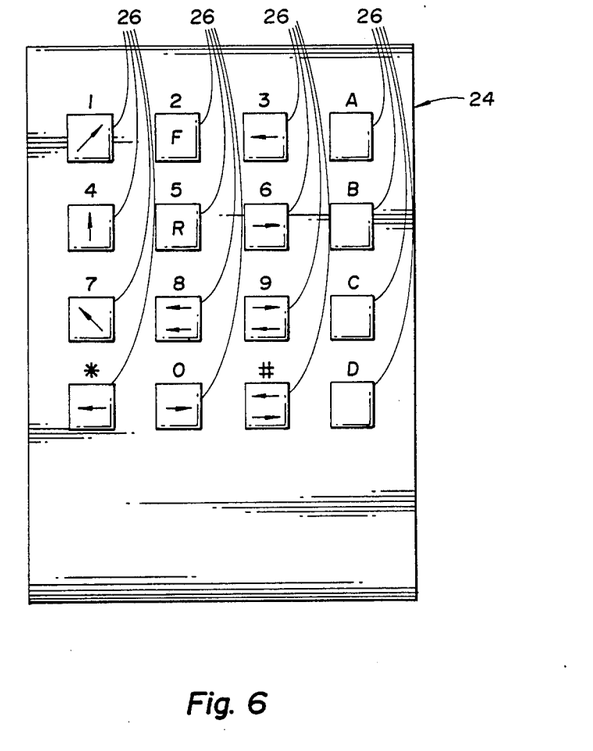
FIG. 6 is a plan view of the control panel of a radio transmitter used to operate a receiver and thereby control the operation of the cart from.a remote location.
Figure 7:
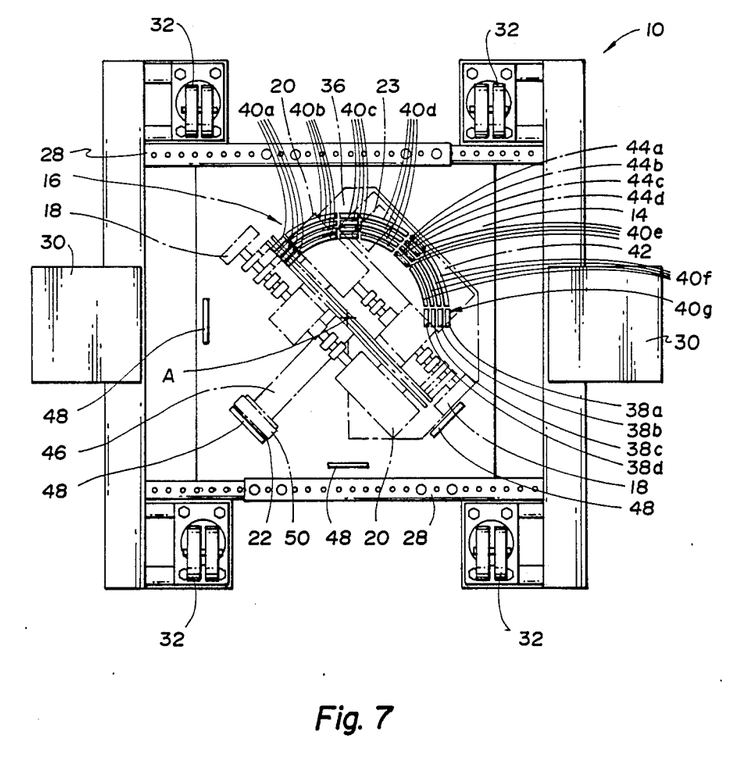
FIG. 7 is a bottom plan view of the display cart showing acruate connector strips and magnetic positioner surfaces that provide positioning and latching of a turret on which the drive motor arrangement is mounted.

A radio receiver 23, shown in FIG. 7, located on cart 10, operates drive mechanism 16 and magentic latch mechanism 22. Radio transmitter 24 shown in FIG. 6 has control switches 26 that when closed operate receiver 24 to control cart 10 from a remote location. The switches 26 have the designations of a push-button telephone and are further labeled according to the position or function resulting from a particular switch 26 operation.

Switches 26 designated 1, 4, 7 and * are position switches for 45 degree right, forward, 45 degree left and 90 degrees to forward movement respectively and these switches control the positioning of drive mechanism 16 relative to carriage 14 about vertical axis A is hereinafter more fully described. Switches 26 designated 2, 3, 5, 6, 8, 9, 0 and # are function switches for controlling movement of the cart after the drive mechanism has been positioned.

Figure 2:
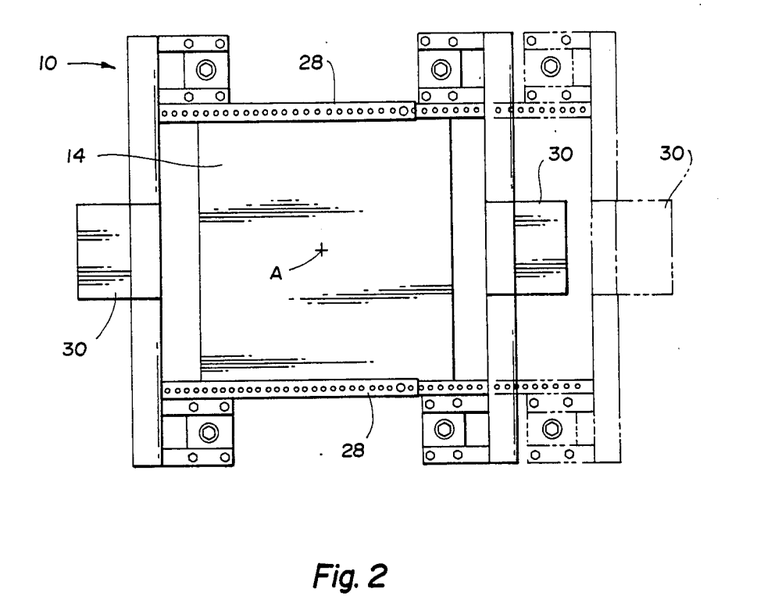
FIG. 2 is a plan view of the heavy duty display cart illustrating a rectangular adjustable frame feature of the preferred embodiment.

As shown in FIG. 2, the carriage 10 is embodied by a frame 28 of a generally rectangular planar shape. The frame 28 is adjustable as shown in phantom to accommodate the different size wheel base of different vehicle. Vehicle wheel support plates 30 are mounted on frame 28 in any suitable manner such as by welding or detachable fasteners.

Figure 3:
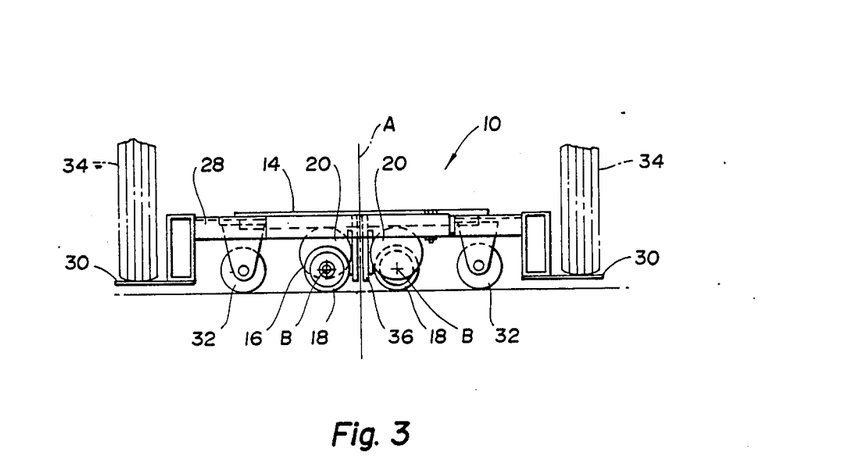
FIG. 3 is an elevational view of the heavy duty display cart showning the mounting of the vehicle wheels.

Referring to FIGS. 3 and 4, casters 32 are mounted on the rectangular frame 28 to provide floor engagement that supports the cart 10. Casters 32 also provide universal movement and heavy duty load bearing capability. Casters 32 furthermore limit the amount of weight imposed on the drive wheels 18. In the preferred construction, rectangular frame 28 has four casters 32 located at its corners. Wheels 34 of vehicle 12 are shown in FIG. 3 as being mounted on wheel support plates 30.

Figure 5:
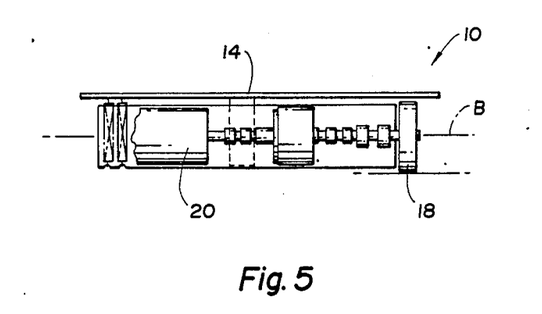
FIG. 5 is a sectional view taken along line 5—5 in FIG. 4 showing a drive wheel and reversible drive motor arrangement.

Referring again to FIG. 4, cart 10 includes a turret 36 that mounts drive mechanism 16 on carriage 14 for clockwise or counterclockwise rotation about vertical axis A. In FIG. 5, the pair of drive wheels 18 and pair of reversible drive motors 20 are shown coupled so that their axes of rotation B are in a horizontal plane. As shown in FIGS. 3 and 4, drive axes B are in a spaced and parallel relationship to each other on opposite sides of vertical axis A. Drive wheels 18 are located at diametrically opposite locations with respect to the vertical axis A.

As shown in FIG. 7, carriage 14 has four arcuate connector strips 38a, 38b, 38c, and 38d positioned circumferentially about vertical axis A. Each arcuate connector strip 38a, 38b, 38c, and 38d extends for 135 degrees and provides electrical connection for a specific movement of turret 36 or of cart 10. Strip 38a provides for the clockwise direction of rotation of turret 36 with respect to carriage 14, strip 38b provides for counterclockwise rotation of the turret with respect to the carriage, strip 38c provides for forward movement of cart 10 and 38d provides for reverse movement of the cart.

Furthermore, each strip 38a, 38b, 38c, and 38d is divided into seven segments 40a, 40b, 40c, 40d, 40e, 40f and 40g that can be independently electrified. The 135 degree span of arcuate connector strips 38a–d correspond to the length of the arc spanned by drive mechanism 16 in the four latching positions, spaced at 45 degrees, of the turret 36 with respect to carriage 14.

With further reference to FIG. 7, brush contact support 42 extends radially of vertical axis A from turret 36. Four brush contacts 44a, 44b, 44c, and 44d mounted on brush contact support 42 slidably engage corresponding arcuate connector strips 38a, 38b, 38c and 38d and form electrical connections that energize reversible drive motors 20 to drive drive wheels 18 and thereby rotate turret 36 with respect to the carriage 14 about vertical axis A or move cart 10.

Referring to FIGS. 4 and 7, turret 36 also has a magnetic support arm 46 extending radially from vertical axis A. The magnetic latch mechanism 22 includes four magnetic positioner surfaces 48 fixed on the carriage 14 radially spaced from the vertical axis A. Once turret 36 is properly positioned with respect to carriage 14, electromagnet 50 mounted on magnetic support arm 46 cooperates with the magnetic positioner surfaces 48 to fix the position of turret 36 with respect to carriage 14 to provide for the different directions of movement of cart 10.

Segments 40a, 40c, 40e, and 40g shown in FIG. 7, correspond to the four fixed positions which turret 36 can assume with the aid of magnetic latch mechanism 22 and the four magnetic positioner surfaces 48. Segments 40b, 40d and 40f correspond to the three arcs through which turret 36 must rotate to assume one of the four positions in which turret 36 can be latched. Respectively, segments 40a, 40c, 40e, and 40g of arcuate connector strips 38c and 38d provide for magnetic latching and subsequent movement of cart 10 and segments 40a, 40b, 40c, 40d, 40e, 40f and 40g of arcuate connector strips 38a and 38b provide for rotation of turret 36 about vertical axis A.

OPERATION OF THE INVENTION

As shown in FIG. 1, two heavy duty display carts 10 are used together to support vehicle 12 for universally movable display. One cart 10 is positioned under front wheels 34 of vehicle 12 and another cart is positioned under rear wheels 34 of the vehicle.

Transmitter 24 is used to control operation of cart 10. When a control switch 26, corresponding to either a position of turret 36 with respect to carriage 14 or a function of movement of cart 10, is closed, by pressing on the switch, a telemetry signal is sent.

Radio receiver 23 receives the signals sent by transmitter 24 and thereby electrifies corresponding segments 40a–g of arcuate connector strips 38a–d.

The current in arcuate connector strips 38a and 38b is transmitted through brush contacts 44a and 44b on brush contact support 42 to reversible drive motors 20 for rotation of turret 36 about vertical axis A with respect to carriage 14. At the preselected fixable position of the turret 36 with respect to the carriage 14, current is provided in segment 40a, 40c, 40e or 40g to latch electromagnet 50 on the corresponding magnetic postioner surface 48. After turret 36 is latched, segments 40a, 40c, 40e and 40g of arcuate connector strips 38c and 38d provide current to brush contacts 44c and 44d to energize reversible drive motors 20 to drive drive wheels 18 to move cart 10 in forward or reverse directions respectively.

For example, if an operator was to rotate turret 36 from a position corresponding to segment 40a to a position corresponding to segment 40e, segments 40a, 40b, 40c and 40d of arcuate connector strips 38a would be electrified to cause reversible drive motors 20 to drive drive wheels 18 to rotate turret 36 in a clockwise direction and segments 40f and 40g of arcuate connector strip 38b would be electrified to similarly rotate the turret in a counterclockwise direction and correct for excessive clockwise travel of the turret. At segment 40e, current would provide for latching of electromagnet 50 with the respective magnetic positioner surface 48 and thereby fix the turret 36 position with respect to the carriage 14.

Finally, to move the cart 10 in forward or reverse directions, segments 40a, 40c, 40e and 40g of arcuate connector strip 38c or 38d are electrified to energize reversible drive motors 20 to drive drive wheels 18 respectively. Strip 38c providing for forward movement and strip 38d providing for reverse movement of the cart 10.

While the best mode for carrying out the invention has been described in detail, those familiar with the art to which this invention relates will recognize alternative ways of practicing the invention as defined by the following claims.

What is claimed is:

1. A heavy duty display cart comprising:
   a carriage for supporting an object to be displayed, such as a vehicle;
   a reversible drive mechanism supported below the carriage for rotation with respect thereto about a vertical axis, said drive mechanism including a pair of drive wheels and a pair of reversible drive motors respectively coupled to the pair of drive wheels to provide rotation of the drive mechanism about the vertical axis or movement of the cart;
   a magnetic latch mechanism on the carriage and drive mechanism for fixing the rotational location of the drive mechanism with respect to the carriage in first second, third, and fourth positions spaced at 45 degree intervals about the vertical axis to thereby provide ten directions of movement of the cart upon reverse driving of the drive mechanism;
   a radio receiver for operating the drive mechanism and the magnetic latch mechanism; and
   a radio transmitter for operating the receiver to control operation of the cart from a remote location.

2. A heavy duty display cart as in claim 1 wherein the carriage comprises a frame of a generally rectangular planar shape.

3. A heavy duty display cart as in claim 2 wherein the frame is adjustable to accommodate the wheel base of the vehicle.

4. A heavy duty display cart as in claim 2 or 3 further comprising casters mounted on the rectangular frame to provide floor engagement that supports the cart for universal movement and heavy duty load bearing capability.

5. A heavy duty display cart as in claim 4 wherein the rectangular frame has four casters located at its corners.

6. A heavy duty display cart as in claim 5 further including a turret that mounts the drive mechanism on the carriage for rotation about the vertical axis.

7. A heavy duty display cart as in claim 6 wherein the pair of drive wheels and pair of reversible drive motors coupled thereto have horizontal drive axes.

8. A heavy duty display cart as in claim 7 wherein the drive axes are in a spaced and parallel relationship to each other on opposite sides of the vertical axis, and the pair of drive wheels being located at diametrically opposite locations with respect to the vertical axis.

9. A heavy duty display cart as in claim 8 wherein the carriage has arcuate connector strips positioned circumferentially about the vertical axis; the turret having a brush contact support attached thereto extending radially from the vertical axis; and the brush contact support having brush contacts that slidably engage the arcuate connector strips and provide electrical connections that energize the reversible drive motors to drive the drive wheels and thereby rotate the turret with respect to the carriage about the vertical axis or move the cart.

10. A heavy duty display cart as in claim 9 wherein the turret also has a magnetic support arm attached thereto extending radially from the vertical axis.

11. A heavy duty display cart as in claim 10 wherein the magnetic latch mechanism includes four magnetic positioner surfaces fixed on the carriage radially spaced from the vertical axis, and the magnetic latch mechanism also including an electromagnet that is mounted on the magnetic support arm and cooperates with the magnetic positioner surfaces to fix the turret position with respect to the carriage.

12. A heavy duty display cart comprising:
   a carriage having a frame of a generally rectangular planar shape for supporting an object to be displayed, such as a vehicle;
   casters mounted at the corners of the rectangular frame to provide for floor engagement that supports the cart for universal movement and heavy duty load bearing capability of the carriage about the ground;
   a turret having a reversible drive mechanism mounted below the carriage for rotation with respect thereto about a vertical axis, said drive mechanism Including a pair of drive wheels and a pair of reversible drive motors to provide rotation of the turret about the vertical axis or movement of the cart;
   the pair of drive wheels and pair of reversible drive motors coupled thereto having horizontal drive axes of rotation;
   the drive axes having a spaced and parallel relationship to each other on opposite sides of the vertical axis;
   the drive wheels being located at diametrically opposite locations with respect to the vertical axis;
   arcuate connector strips mounted on the carriage in a downwardly facing orientation and extending about the vertical axis;
   a brush contact support on the turret extending radially from the vertical axis;
   brush contacts that are supported on the brush contact support in slidable engagement with the arcuate connector strips to provide electrical connections that energize the reversible drive motors to drive the drive wheels and thereby rotate the turret with respect to the carriage about the vertical axis or move the cart;

a magnetic support arm on the turret extending radially from the vertical axis;

a magnetic latch mechanism including four magnetic positioner surfaces fixed on the carriage and also including an electromagnet mounted on the magnetic support arm, said electromagnet cooperating with the magentic positioner surfaces to fix the rotational location of the drive mechanism with respect to the carriage in first, second, third and fourth positions radially spaced at 45 degree intervals about the vertical axis to thereby provide ten directions of movement of the cart upon reverse driving of the drive mechanism;

a radio receiver for operating the drive mechanism and the magnetic latch mechanism; and a radio transmitter for operating the receiver to control operation of the cart from a remote location.

13. A heavy duty display cart comprising:

a carriage having an adjustable frame of a generally rectangular planar shape for supporting an object to be displayed, such as a vehicle;

casters mounted at the corners of the rectangular adjustable frame to provide for floor engagement that supports the cart for universal movement and heavy duty load bearing capability of the carriage about the ground;

a turret having a reversible drive mechanism mounted below the carriage for rotation with respect thereto about a vertical axis, said drive mechanism including a pair of drive wheels and a pair of reversible drive motors to provide rotation of the turret about the vertical axis or movement of the cart;

the pair of drive wheels and pair of reversible drive motors coupled thereto having horizontal drive axes of rotation;

the drive axes having a spaced and parallel relationship to each other on opposite sides of the vertical axis;

the drive wheels being located at diametrically opposite locations with respect to the vertical axis;

arcuate connector strips mounted on the carriage in a downwardly facing orientation and extending about the vertical axis;

a brush contact support on the turret extending radially from the vertical axis;

brush contacts that are supported on the brush contact support in slidable engagement with the arcuate connector strips to provide electrical connections that energize the reversible drive motors to drive the drive wheels and thereby rotate the turret with respect to the carriage about the vertical axis or move the cart;

a magnetic support arm on the turret extending radially from the vertical axis;

a magnetic latch mechanism including four magnetic positioner surfaces fixed on the carriage and also including an electromagnet mounted on the magnetic support arm, said electromagnet cooperating with the magnetic positioner surfaces to fix the rotational location of the drive mechanism with respect to the carriage in first, second, third and fourth positions radially spaced at 45 degree intervals about the vertical axis to thereby provide ten directions of movement of the cart upon reverse driving of the drive mechanism;

a radio receiver for operating the drive mechanism and the magnetic latch mechanism; and a radio transmitter for operating the receiver to control operation of the cart from a remote location.

* * * * *

UNITED STATES PATENT AND TRADEMARK OFFICE
CERTIFICATE OF CORRECTION

PATENT NO. : 4,694,923

DATED : September 22, 1987

INVENTOR(S) : Lawrence B. Grenzicki

It is certified that error appears in the above-identified patent and that said Letters Patent is hereby corrected as shown below:

| | | |
|---|---|---|
| Column 2, | Line 36, | "showning" should be --showing--; |
| | Line 57, | "movable" should be --movably--; |
| Column 3, | Line 29, | After "axis A" insert --as--; |
| | Lines 37-38, | "vehicle" should be --vehicles--; |
| Column 5, | Claim 1, Line 48, | After "first" insert --,--. |

Signed and Sealed this

Twenty-second Day of November, 1988

Attest:

DONALD J. QUIGG

*Attesting Officer*   *Commissioner of Patents and Trademarks*